Sheet 1-2 Sheets.

I. C. Twining.

Harvester Rake.

№ 3284 Reissued Feb. 2, 1869.

Witnesses

Geo. E. Buckley

Franklin Small

Inventor

A. J. Holman

Sheet 2 - 2 Sheets.
I. C. Twining.
Harvester Rake.
No. 3284 Reissued Feb. 2, 1869.
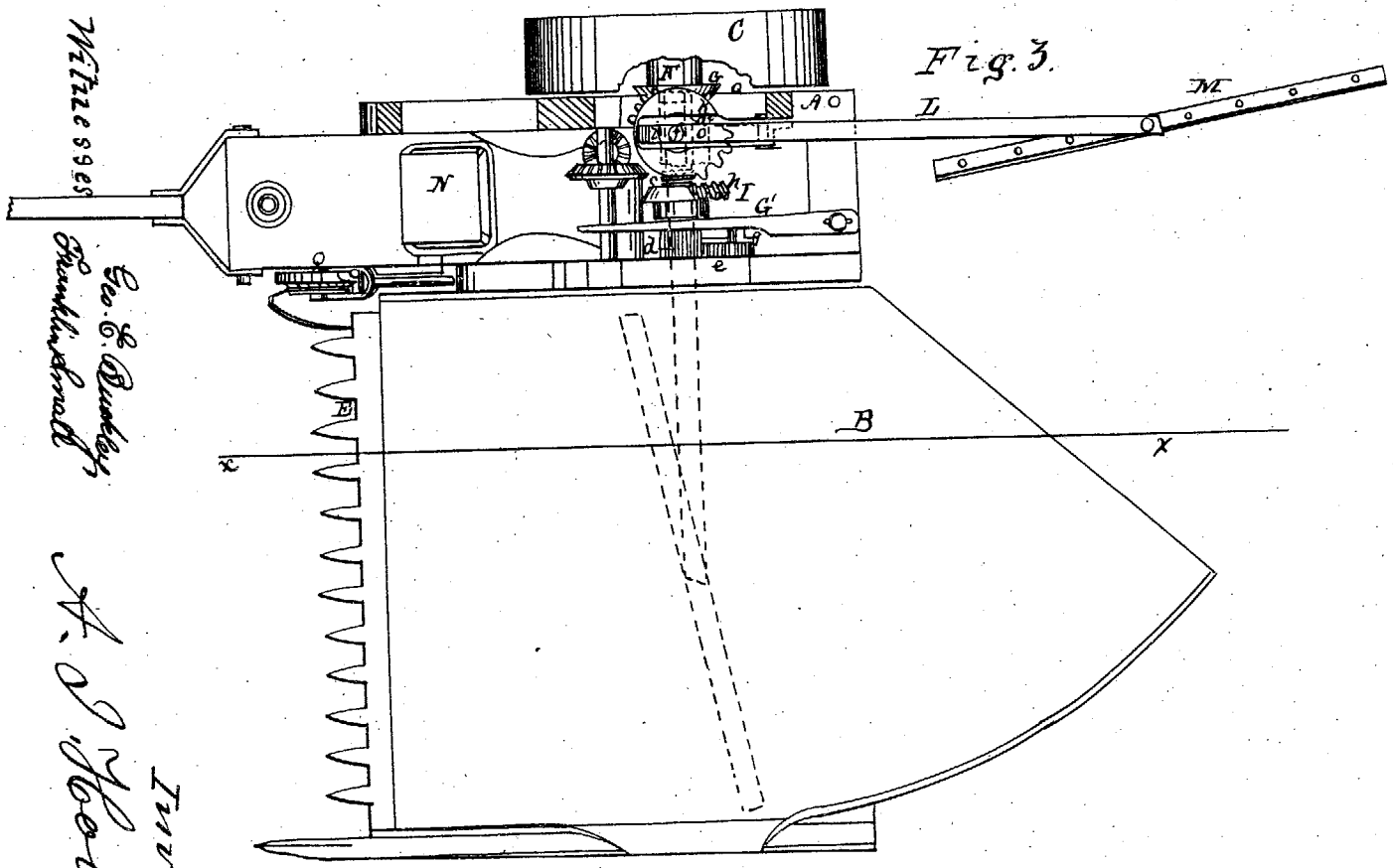
Witnesses
Geo. E. Buckley
Franklin Small
Inventor
A. J. Holman

United States Patent Office.

ANDREW J. HOLMAN, OF PHILADELPHIA, PENNSYLVANIA, ASSIGNEE, BY MESNE ASSIGNMENTS, OF ISAAC C. TWINING.

*Letters Patent No.* 29,640, *dated August* 14, 1860; *reissue No.* 3,284, *dated February* 2, 1869.

IMPROVEMENT IN HARVESTER-RAKES.

The Schedule referred to in these Letters Patent and making part of the same.

*To all whom it may concern:*

Be it known that ISAAC C. TWINING, of Wrightstown, in the county of Bucks, and State of Pennsylvania, did invent a new and improved Raking-Device for Harvesters; and that the following is a full, clear, and exact description of the same, reference being had to the annexed drawings, making a part of this specification, in which—

Figure 3, a plan or top view of the same.

Similar letters of reference indicate corresponding parts in the several figures.

The said invention relates to an improvement in that class of raking-devices in which a sweep-rake is employed and arranged to sweep over the platform in the arc of a circle.

Th said invention consists in a novel and improved means of operating the rake, substantially as hereinafter shown and described, whereby the two movements required to be given to the rake, to wit, the sweeping across the platform, and the rising and falling one, may be obtained in a very simple and economical way, and the rake made to operate intermittingly, when necessary, and the driver can sit upon the machine, and regulate the cutting and raking-apparatus while the machine is in motion.

To enable others skilled in the art to fully understand and construct the said invention, I will proceed to describe it.

A represents the main frame of a harvester, and B the platform.

C is the driving or ground-wheel, and D, a caster-wheel, which supports the front end of a plank on which the driver's seat, N, is placed, the back end of said plank being attached to the main frame A.

The sickle E, which may be of the usual reciprocating kind, is located in front of the platform, which is curved at its outer side, to correspond with the arc described by the rake in its movement.

C is the main driving-wheel, attached loosely to the axle F, and on this axle is a vertical mitre-wheel, G, which gears with a horizontal crown or mitre-wheel, K.

The horizontal crown or mitre-wheel K is supported on a vertical axle, J, which has its lower journal on the bearing of the main axle F.

The radial rake-arm is pivoted to the upper surface of the crown-wheel K.

The wheel G has a portion or section of its periphery toothed, as shown at *a*.

On the axle F there is also placed a cam, H.

The wheel I has only a portion or section of its periphery toothed, as shown at *b*. The wheel is allowed to slide on the axle F, but is connected to it by a feather and groove, so as to turn with the axle.

Between the wheel I and the cam H there is placed a spiral spring, *c*, which has a tendency to keep the wheel I off from the cam H.

On the inner end of the axle F there is placed a pinion, *d*, into which a pinion, *e*, on a shaft, *f*, gears.

To the outer side of the pinion *e* there is attached a cam, *g*, against which a lever, G′, is pressed by the spiral spring *c*, the back end of said lever being attached to the back part of the main frame A.

Figure 1:
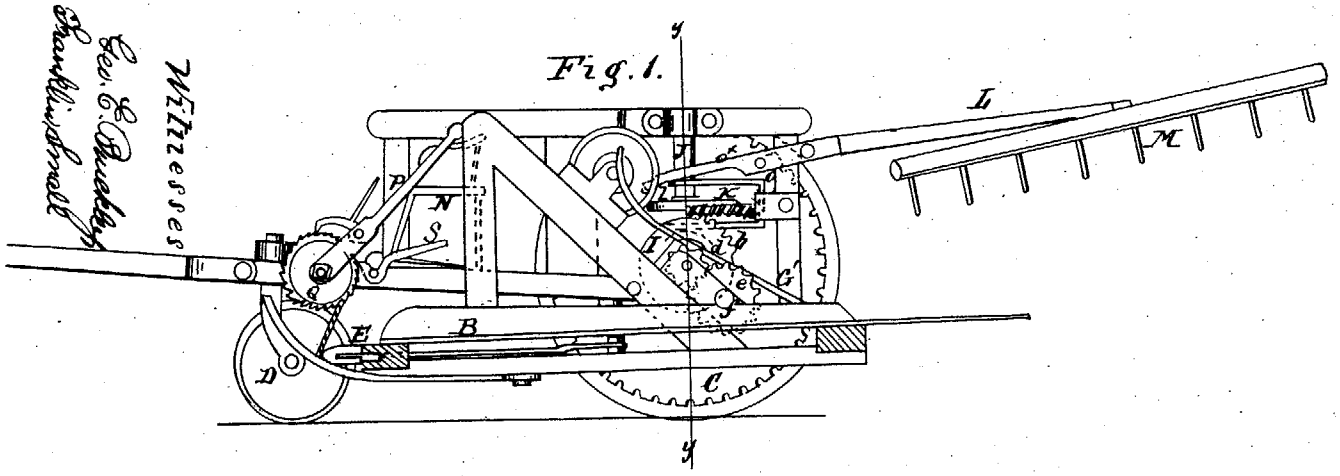
Figure 1 is a side section view of a harvester with this invention applied to it, *x x*, fig. 3 indicating the plane of section.
Figure 2:
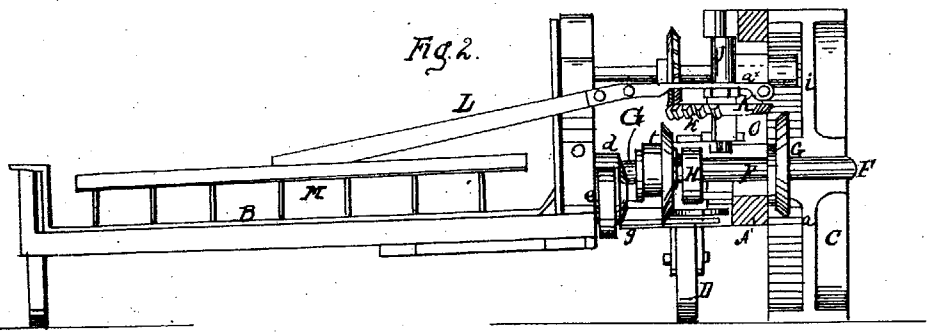
Figure 2 is a back sectional view of the same, taken in the line *y y*, fig. 1.

The front end of the lever G′ is forked, and is fitted on the axle F, and has the wheel I pressed against it by the spiral spring *c*. (See figs. 2 and 3.) This bar G′ may be continued forward to the driver's seat.

The wheel K has two sections or portions, *h h*, of its periphery toothed, said toothed portions being at opposite sides of the wheel, as shown in fig. 3. To the upper surface of the wheel K there is attached, by a pivot, or joint, *i*, a radial rake-arm.

The joint *i* admits of the bar L rising and falling in a vertical plane, and said joint being near the periphery of the wheel K, the latter serves as a crank for the rake-bar, as will be presently described.

The inner end of the rake-bar has a metal link, or strap, *a*×, attached, through which the shaft J passes.

The outer end of the arm L has a rake, M, attached, the length of which is equal to the width of the platform B.

On the vertical shaft J there is placed a bent sliding bar, *o*, the lower part of which rests on the cam H, the upper part sustaining the rake-bar L.

N is a seat for the driver, and

P is a lever working a pawl into a ratchet-wheel, Q.

On the same shaft is a small drum or pulley, around which a chain winds, attached to the finger-bar, and by which said finger-bar can be raised or lowered, while the machine is moving through the field, by the attendant sitting on the seat.

S is a small foot-lever, by which the attendant can fix the wheel Q at any point desired, and sustain the cutter-bar at any height desired.

A bent lever, G′, extends from the rear of the frame forward to the driver's seat.

The operation is as follows:

As the machine is drawn along, the toothed portions *a b* of the wheels G I gear alternately with the wheel K, and give a vibrating motion to the rake-bar L and rake M, the wheel I moving the rake forward to the front end of the platform, and the wheel G moving it backward. Previous to each forward movement of the rake, the cam H elevates the rake-bar, and retains it in an elevated position while it is moving forward, the cam allowing the rake to fall at the termination of its forward stroke or movement. As the rake moves backward, it is in contact with the platform, and the cut grain is raked therefrom. As the rake reaches the termination of its backward movement, the bar L is elevated, preparatory to its forward movement, by the action of the cam H on bar O. The forward movement of the rake does not always take place immediately at the termination of its backward movement, for the cam *g* must first throw the wheel I in contact with wheel K, and said cam is so formed as to allow the rake to dwell or rest a certain time before moving forward. This arrangement admits of the platform receiving the necessary amount of grain to form a gavel before being taken off. In cases, however, where there are heavy crops, the wheel I may be kept up to wheel K by means of a pin or key, and no cessation of movement allowed the rake.

Thus it will be seen that, by a very simple arrangement of means, the desired movements are given the rake.

I would remark that pinion *e*, with cam *g*, may be shifted beyond contact with the lever G', said lever being, as before stated, extended within reach of the driver, thus placing the movements of the rake under his control.

Having thus described the invention,

What is claimed as new, and desired to be secured by Letters Patent, is—

1. A crown or bevel-wheel, to which the rake-arm is pivoted, located on the inner side of the drive-wheel, and below the highest point thereof.

2. The arrangement of the crown or rake-driving wheel, to which the rake-arm is pivoted, on the inner side of the drive-wheel, and within the periphery of said wheel.

3. Hinging or pivoting the rake-arm to the upper face of a crown or rake-driving wheel, so as to permit the necessary rising and falling movements of the rake.

4. A sweep-rake, hinged to a horizontal, or nearly horizontal, bevel or rake-driving wheel at a point inside of the ground or drive-wheel, and below the highest point of said wheel.

5. The use of the inner bearing of the drive-wheel as the support for the shaft, or pivot, of the crown or bevel-wheel, to which the rake-arm is pivoted.

6. An automatic rake, hinged or pivoted at a point within the periphery of the driving-wheel, to a crown or bevel-wheel which conforms to the movement of the platform, in combination with a lifting-mechanism, controlled by the attendant in his seat on the machine, for adjusting the position of the cutting-apparatus, platform, and rake.

7. An automatic rake, hinged to and operated by a horizontal crown or bevel-wheel, in combination with means whereby the rake may be made to discharge the grain more or less frequently, as the condition of the crop may require.

8. The arrangement of the wheels I K G, toothed at their peripheries in sections, in connection with the bent bar *o*, cam H, and rake-bar L, attached to the upper surface of the cam-wheel K, substantially as and for the purpose set forth.

9. The arrangement, with the wheel I, of the pinions *d e*, cam *g*, and lever G', and spring *c*, substantially as shown, for the purpose of giving the necessary dwells or cessations of movement to the rake, as and for the purpose set forth.

Witnesses: A. J. HOLMAN.

JOHN WHITE,
GEO. E. BUCKLEY.